United States Patent [19]  
Patil

[11] 4,289,745  
[45] Sep. 15, 1981

[54] PIGMENTS STABLE AT HIGH TEMPERATURES

[75] Inventor: Arvind S. Patil, Wyoming, Mich.

[73] Assignee: BASF Wyandotte Corporation, Wyandotte, Mich.

[21] Appl. No.: 144,735

[22] Filed: Apr. 28, 1980

Related U.S. Application Data

[63] Continuation-in-part of Ser. No. 70,196, Aug. 27, 1979, abandoned.

[51] Int. Cl.³ .............................................. C01G 41/00
[52] U.S. Cl. ................................ 423/594; 252/62.63; 106/301; 106/304
[58] Field of Search ............... 423/594; 252/62.63; 106/304, 301

[56] References Cited

U.S. PATENT DOCUMENTS

| | | | |
|---|---|---|---|
| 2,904,395 | 9/1959 | Downs et al. | 423/594 |
| 3,075,919 | 1/1963 | Gruber et al. | 106/301 |
| 3,822,210 | 7/1974 | Iwase et al. | 423/594 |
| 3,832,455 | 8/1974 | Smith et al. | 423/594 |
| 3,873,462 | 3/1975 | Trandell et al. | 252/62.56 |
| 3,887,479 | 6/1975 | McLain | 423/594 |
| 3,904,421 | 9/1975 | Slimizer | 423/594 |
| 4,025,449 | 5/1977 | Pezzoli et al. | 423/594 |
| 4,075,029 | 2/1978 | Nuss | 106/304 |
| 4,097,392 | 6/1978 | Goldman et al. | 423/594 |

Primary Examiner—Herbert T. Carter  
Attorney, Agent, or Firm—David L. Hedden; Joseph D. Michaels

[57] ABSTRACT

A pigment capable of withstanding elevated temperatures such as 175° C. is provided by the formation of a spinel of iron and other metal, such as Cu, Ca, Cd, Co, Ba, Sr, Mg, Mn, and Li. The pigment is made by a method which does not involve a step of calcining at high temperature, such as 600° C. to 1100° C., but rather involves precipitation from aqueous solution and subsequent exposure to elemental oxygen, as by aeration, to form submicron-sized particles of desired spinel. Colors other than yellow may be obtained, and the spinels of Fe-Ba and Fe-Sr have magnetic properties.

9 Claims, 2 Drawing Figures

PIGMENTS STABLE AT HIGH TEMPERATURES

CROSS-REFERENCE TO RELATED APPLICATION

This application is in part a continuation of the applicant's copending application Ser. No. 70,196 filed Aug. 27, 1979 and now abandoned.

BACKGROUND OF THE INVENTION

1. Field of the Invention

The present invention relates to inorganic pigments and to a method for making them. More particularly, the present invention concerns such pigments which are stable at high temperatures and suitable for use in the processing of plastics.

2. Prior Art

As is known to those skilled in the art to which the present invention pertains, most inorganic pigments are not suitable for plastics processing because of their thermal instability at temperatures above 175° C. Thus, the known yellow pigments such as iron oxide, lead chromate and zinc chromate are not well chosen for the yellow coloring of plastics such as polyethylene, polypropylene, polyvinyl chloride, polycarbonates, polyamide and the like. The same is true of other inorganic pigments for obtaining other colors. Furthermore, organic pigments show color degradation at temperatures of about 175° C., thereby precluding their use in the processing of plastics. Thus, the need for pigments stable at high temperatures and capable of giving various desired colors is readily apparent.

As will subsequently be detailed, the present invention provides such stable pigments, ones capable of giving hues which range in color from pale yellow to brown to red.

STATEMENT OF RELEVANT PATENTS

To the best of applicant's knowledge, the following patents are the ones most relevant to the determination of patentability:

| U.S. Pat. Nos. | | |
|---|---|---|
| 2,904,395 | 4,097,392 | 3,822,210 |
| 3,887,479 | 4,075,029 | 3,832,455 |

Perhaps the most pertinent of the patents mentioned above is Iwase et al, U.S. Pat. No. 3,822,210. Although this patent teaches the making of ferrite spinel pigments, it does not teach or suggest the present invention because it uses a method which is different from that disclosed by applicant, and its different method produces a different product. The products made by Iwase et al are isotropic ferrites. They are made under conditions of temperature and mole ratio of alkali to metal salts different from those taught in accordance with the present invention. Iwase et al teach that their product is formed only if the conditions of temperature and mole ratio of alkali to metal salts fall above the dashed curved in FIGS. 2A to 2C to the patent. Their method involves heating the precipitate while oxidation is occurring, and it pertains to zinc, manganese, magnesium, and cobalt ferrite spinels.

The products made by the present invention are acicular (needle-like) ferrite spinels. The product is formed under conditions of temperature and mole ratio of alkali to metal salts which are different from those disclosed in Iwase et al. Moreover, applicant's method provides that heating of the precipitate takes place after oxidation has occurred, and it pertains to copper, calcium, cadmium, cobalt, barium, strontium, magnesium, manganese, and lithium ferrite spinels.

SUMMARY OF THE INVENTION

In accordance with the present invention, inorganic temperature-stable pigments are provided by a spinel of iron and a metal selected from the group consisting of Cu, Ca, Cd, Co, Ba, Sr, Mg, Mn, and Li, as well as mixtures thereof.

The spinels hereof may be produced by reacting a ferrous sulfate and a metal nitrate with a basic solution. The reaction proceeds at ;b 5° C. to 50° C., preferably room temperature. The precipitate is then aerated and reheated to obtain the spinels hereof. Different colors may be obtained, depending on the metal(s) selected.

The spinels are temperature-stable up to about 900° C.

For a more complete understanding of the present invention, reference is made to the following detailed description and accompanying examples.

DESCRIPTION OF THE DRAWINGS

An understanding of the invention will be aided by consideration of the appended drawings, in which.

DESCRIPTION OF THE PRIOR ART

Figure 1:
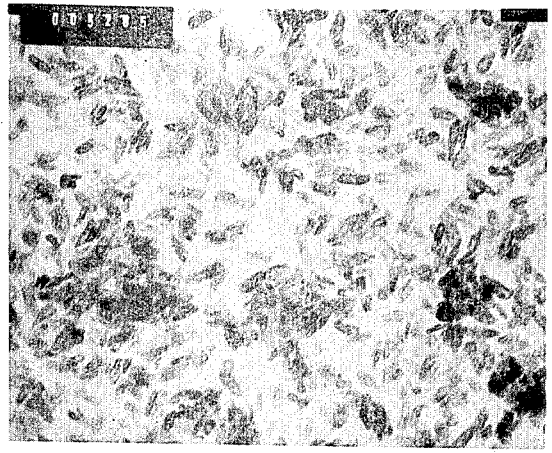
FIG. 1 is a photomicrograph at a magnification of 160,000 dimensions of lithium spinel pigment particles made in accordance with the present invention.

The present invention provides spinel pigments which are temperature-stable up to about 900° C.

As is known to the skilled artisan, yellow iron oxide pigments are called "geothite." These pigments are considered to be hydrated oxides with a crystalline composition of alpha-FeOOH. It is the transformation of yellow alpha-FeOOH to a red alpha-$Fe_2O_3$ which causes color instability. The transformation of alpha-FeOOH to alpha-$Fe_2O_3$ occurs over a wide temperature range, beginning at 175° C., and is dependent upon the nature of the pigment and the particle size thereof.

The transformation in such iron-oxide pigments is a function of temperature and length of time of exposure to such temperature. Generally, those skilled in the art consider the transformation to involve the dehydration of alpha-FeOOH to alpha-$Fe_2O_3$. A study of this phase transformation using differential thermal analysis shows that the transformation is complete at 265° C. to 277° C., although the transformation commences at much lower temperatures.

The present invention, as will subsequently be detailed, is based upon the fact that the phase transformation is related not solely to dehydration but also to crystalline rearrangement. For example, all four hydrated iron oxides with a composition of FeOOH differ in color by virtue of their crystalline structure, only alpha-FeOOH being yellow.

The present invention provides spinels of iron with various metals to produce stable pigments. The various metals which can be used in accordance with the present invention are ones selected from the group consisting of Cu, Ca, Cd, Co, Ba, Sr, Mg, Mn, and Li, as well as mixtures thereof. Various pigment colors may be obtained, depending upon the metal(s) selected.

Although the applicant does not wish to be bound by any theory, it appears that, by virtue of the distribution of iron and other atoms within the spinel structure, the mobility of the iron atom is greatly inhibited and restricted. This restiction is further fortified by the electrostatic interaction between the metals, iron, oxygen and hydroxyl groups in the pigment. This restricted mobility results in a higher requirement of thermal energy to bring about the yellow-to-red color transformation of the iron oxide.

The spinels hereof may be produced by the reaction of hydrated ferrous sulfate and a metal nitrate hydrate or its equivalent in a solution, initially acidic, which has been subsequently brought to an alkaline pH. The reaction preferably proceeds at room temperature although those skilled in the art will appreciate that other temperatures such as 5° C. to 50° C. also may be used, if desired. The precipitate so obtained is then oxidized to promote the oxidation of the ferrous iron.

To state the present invention in its method aspect comprehensively, this invention may be viewed as comprising a method of making a pigment having good stability at high temperatures, said method comprising the steps of forming a first aqueous solution consisting essentially of water, a soluble ferrous salt, and at least one other salt, said salt being a soluble salt of a non-ferrous metal selected from the group consisting of copper, calcium, cadmium, cobalt, barium, strontium, magnesium, manganese, and lithium, said ferrous salt and said non-ferrous salt being present in said solution in proportions such that the respective quantities of iron and other metal which are present will yield, when said solution is so adjusted in pH as to cause precipitation, the formation of a substantial quantity of a precipitate oxidizable to a spinel of the formula $XFe_2O_4$ and/or $YFe_5O_8$, in which X is a metal selected from the group consisting of Cu, Ca, Cd, Co, Ba, Sr, Mg, and Mn, and Y is Li, mixing with said first aqueous solution a second aqueous solution to form a reaction mixture, said second solution containing a substantial proportion of a soluble alkalizing compound selected from the group consisting of the carbonates, bicarbonates, and hydroxides of the alkali metals, the said second solution being used in such quantity and the said first and second solutions being in such a state of dilution that there results upon said mixing the formation of a precipitate in the form of particles of submicron size, the liquid phase of said reaction mixture being as a result of such precipitation substantially completely depleted in its content of lithium ions and of metal ions having a valence greater than one; oxidizing the said precipitate to form a spinel in aqueous solution; then heating said aqueous solution having said spinel therein to a temperature of from about 75° to 100° C; and recovering said spinel.

Although we have worked particularly with hydrated metal nitrates, those skilled in the art will appreciate that it may in certain instances be possible to achieve the desired results with other equivalent materials which will suggest themselves to those skilled in the art. The use of hydrated salts is in general to be preferred, because such salts usually can be dissolved in water somewhat more quickly, other things being equal, than their anhydrous counterparts. After an aqueous solution of a desired strength has been obtained, it makes no difference whether the salt was or was not originally in the hydrated form.

Various other soluble anions may sometimes be used in place of nitrate, such as chloride or sulfate.

Suitable bases or solutions thereof are alkali-metal bases such as the sodium or potassium carbonates, hydroxides, bicarbonates and the like. A particularly preferred base is sodium carbonate. Generally, a stoichiometric equivalent of base is employed. To be more specific, this means the use of one mole of sodium carbonate (or its equivalent, such as two moles of sodium bicarbonate) for each mole of, for example, hydrated ferrous sulfate.

The use of a stoichiometric quantity of sodium carbonate or the like is usually to be preferred, but statisfactory results can be obtained in some cases, whether the quantities used are in a stoichiometric relation or not. By "satisfactory results," we mean obtaining by reaction in an aqueous medium an appreciable yield of a fine-particled spinel having a desired composition and good high-temperature stability. If the departure from the quantities dictated by stoichiometry is not too great, an appreciable yield of the desired spinel can be obtained, even though the process is operated somewhat wastefully in respect to its use of carbonate or of metal salt. It is necessary to use at least enough of sodium carbonate to precipitate both the iron and a substantial proportion of the other metal, such as cobalt.

In the practice of the present invention, obtaining particles of the desired size is an important consideration. The particle size is in part dependent upon the degree of dilution of the reactant solutions employed; the use of solutions more dilute yields particles of finer size, other things being equal.

Oxidation can be performed in any suitable manner. One way is aeration (spraying the suspension-containing solution into air from a perforated pipe). Another is bubbling air or a mixture of oxygen and inert gas through the suspension-containing solution. Another is shaking the suspension-containing solution in a vessel along with air or a mixture of oxygen and an inert or unreactive gas. Still another possibility is the use of a suitable chemical oxidizing agent, such as hydrogen peroxide or any of a number of chemical oxidants which can provide oxygen but will not (as potassium permanganate or sodium dichromate would) tend to impart any color to the solution. The oxidation action which is required is one that it is not practical to obtain by allowing the solution to stand while exposed to air or an atmosphere of oxygen. Titration can be used to monitor the progress of the oxidation.

The solution is then heated to a temperature of from about 75° C. to about 100° C. It is desirable to maintain the high temperature for a time along enough to "set the crystal," i.e., ensure the development of desired crystalline forms in the product. X-ray diffraction tests can be used to monitor the progress and ensure the completion of the development of the desired crystalline forms.

The spinel is then recovered by conventional filtration and washing techniques.

The spinel thus obtained has a very fine particle size. The spinel particles are substantially all of a size under one micron in maximum dimension, and in most cases, they are even finer, such as 0.1 micron in maximum dimension. The performance of pigments containing the spinel particles is dependent upon their having particles of the size indicated. In general, a fusion process for obtaining spinels results in particles substantially larger than those obtained with the present invention. Fine particles made according to the present invention give purer colors than larger particles, made by fusion process, do.

Figure 2:
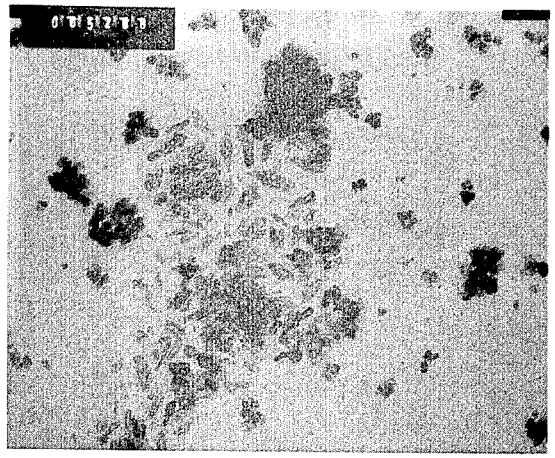
FIG. 2 is a photomicrograph at the same magnification of cobalt spinel pigment particles made in accordance with the invention.

In further description of the temperature-stable spinel product made in accordance with the invention, it may be stated that a procedure of the kind detailed above gives particles which are of acicular (needle-like) shape and, as is revealed in the drawings, of a length which is on the order of 0.01 to 0.13 microns. FIG. 1 is a photomicrograph of lithium spinel pigment particles at a magnification of 160,000 dimensions, and FIG. 2 is a photomicrograph of cobalt spinel pigment particles at the same magnification. Both spinels are made in accordance with the present invention.

The photomicrographs reveal that the process discussed above yields a product different from any encountered in the above-mentioned U.S. patents. The particles of U.S. Pat. No. 2,904,395 are said to be acicular, but with a length of 0.4 to 1.0 micron, as compared with about 0.01 to 0.13 micron for the particles shown in FIGS. 1 and 2.

That the materials shown in FIGS. 1 and 2 are spinels has been confirmed by X-ray diffraction tests. The same materials exhibit an absence of the characteristic endotherm in differential thermal analysis at a temperature around 260° C. to 277° C. Such endotherm is characteristic of phase transformation of yellow alpha-FeOOH to red $Fe_2O_3$. This means that the materials in FIGS. 1 and 2 are spinels and are not alpha-FeOOH.

U.S. Pat. No. 3,832,455 does not provide information concerning the size and shape of the particles produced by its teachings, but its method involves a necessary calcining and it is unlikely that it yields a product containing acicular particles. U.S. Pat. No. 3,887,479 similarly involves use of high temperatures and does not contain information concerning the morphology of its product particles. The differences between the particles of U.S. Pat. No. 3,822,210 and those of the present invention are apparent from a consideration of FIGS. 1 and 2 hereof and the photomicrographs in that patent, allowance being made for the difference in scales between them and FIGS. 1 and 2.

In most instances, the spinels made in accordance with the present invention are ones in which one atom of divalent metal and two atoms of trivalent iron serve to balance the electronegativity of four atoms of oxygen. The invention includes, however, in one aspect, the making of spinels of iron and lithium, the latter element being monovalent but being different from the other alkali-metal elements by reason of the relatively low solubility of its hydroxide in water. The water solubility of lithium hydroxide is, to be sure, many times as great as that of the hydroxide of some of the other elements which can be represented by X, such as cadmium or manganese, but it is nevertheless quite low enough that when a soluble lithium salt is treated in aqueous solution with an alkalizing agent, precipitation of lithum ions to a useful degree will take place and there will also result, to the extent which is possible when one considers the extent of water solubility of lithium hydroxide, the development of an alkalized solution or reaction mixture which is as a result of such precipitation substantially completely depleted in its content of ions of lithium. As was previously mentioned, the corresponding formula for the lithium spinel is $LiFe_5O_8$.

The colors which are produced in the resulting spinel, when the various metals mentioned are used, are dependent upon the metal chosen, as will be indicated in the following Table.

TABLE

| Identity of Nonferrous Metal | Color of Spinel |
|---|---|
| Co | Dark Brown |
| Cu | Reddish Yellow |
| Mn | Reddish Brown |
| Ba | Orange |
| Ca | Orange with Red Cast |
| Cd | Yellow |
| Li | Reddish Brown |
| Sr | Orange with Brown Cast |

Those skilled in the art will know how to incorporate the spinel pigments into plastics or the like. The necessary proportions, procedures, and equipment do not require explanation. The details of the process can be obtained from references such as Temple C. Patton, *Pigment Handbook*, Vol. II, pages 277-285 (John Wiley & Sons, New York, 1973).

When plastics have incorporated in them the submicron-sized spinel particles made according to the invention, the plastics are provided with a desired color without losing their transparency or translucency. Thus, in effect, the plastic is provided with color as if it had been dyed, but the effect is more temperature-stable than that obtained with any known dye.

It has also been found that the strontium-iron and barium-iron spinels hereof exhibit magnetic properties. More specifically, when the strontium-iron and barium-iron spinels are heated to about 1100° C. to about 1200° C., a crystalline transformation occurs. Such a transformation has previously been available only at a higher temperature, such as about 1800° C. This transformation results in pigments having magnetic properties. This is of particular importance in the preparation of armatures and brushes for small or miniature electric motors, by providing magnetic particles at a reduced cost of production.

Following are specific examples illustrating the principles of the present invention. These examples are to be construed as illustrative, and not limitative, of the present invention. In the examples, all parts are by weight, absent indications to the contrary.

EXAMPLE I

Into a suitable reaction vessel equipped with titration means, cooling means, aeration means, and agitation means, there was added a 3-liter solution of 27.8 grams per liter of $FeSO_4.7H_2O$ and 15.9 grams per liter of $CoCl_2.6H_2O$. With stirring, 100 milliliters of water having 46.2 grams of sodium carbonate dissolved therein was added. The temperature in the vessel at the time of carbonate addition was approximately 12° C. The solution containing $CoCl_2$ and $FeSO_4$ was wine red, and upon the addition of the sodium carbonate solution, the reaction mixture turned milky purple.

Air was bubbled into the reaction vessel via the aeration means for a period of four hours, the color of the reaction mixture turning black-green. After the aeration was completed, the precipitated solution was heated to 90° C. and maintained thereat for one hour, then cooled to room temperature. The color of the reaction mixture remained the same during the heating step. The precipitate was then recovered by filtration of the solution, and washed and dried. The product iron-cobalt spinel was dark brown in color. A temperature-stable pigment consisting of sub-micron-sized particles of spinel was obtained.

EXAMPLE II

Example I was repeated, using as an iron-metal solution one that contained 27.8 grams per liter of $FeSO_4.7H_2O$ and 10.8 grams per liter of $CuSO_4$. The initial solution containing iron and copper ions was bright blue. After the addition of sodium carbonate, the solution turned olive green. After four hours of oxidation, the reaction mixture turned yellow and held at that color through the subsequent heating step. A product which was yellow with a red shade was obtained.

EXAMPLE III

Example I was repeated, using an iron-metal solution containing 27.8 gram per liter of $FeSO_4.7H_2O$ and 11.3 grams per liter of $MnSO_4.H_2$). Upon addition of the sodium carbonate solution, the reaction mixture turned power blue. After two hours of oxidation, the color of the reaction mixture turned red-brown and held throughout the remaining oxidation and subsequent heating. A reddish-brown product was obtained.

EXAMPLE IV

Example I was repeated, except that the iron-metal solution contained 27.8 grams per liter of $FeSO_4.7H_2O$ and 16.3 grams of $BaCl_2.2H_2O$. The initial solution was milky white. After the addition of sodium carbonate solution, the reaction mixture was powder blue. After 1.5 hours of oxidation, the reaction solution turned red-brown and held. A slightly orange product was obtained.

EXAMPLE V

Example I was repeated, using an iron-metal solution containing 25.8 grams per liter of $FeSO_4.7H_2O$ and 17.8 grams per liter of $SrCl_2.6H_2O$. In the making of the initial solution, upon addition of the strontium chloride solution to the ferrous sulfate solution, the reaction mixture became slightly viscous and was light blue in color. Addition of the sodium carbonate solution gave a power-blue reaction mixture. After 1.5 hours of oxidation, the color turned red-brown and held. A product was obtained that was slightly orange with a brown cast.

EXAMPLE VI

Example I was repeated, using an iron-metal solution containing 25.8 grams per liter of $FeSO_4.7H_2O$ and 7.4 grams per liter of $CaCl_2$. The initial solution was clear. On addition of the sodium carbonate solution, the reaction mixture turned powder blue, and then blue-black. After two hours of oxidation, the solution turned red-brown and held. A product was obtained which was vivid orange with a red cast.

EXAMPLE VII

Example I was repeated, using an iron-metal solution containing 25.8 grams per liter of $FeSO_4.7H_2O$ and 20.6 grams per liter of $Cd(NO_3)_2.4H_2O$. On addition of the sodium carbonate solution, the reaction mixture turned a light powder blue. After one hour of oxidation, the color was light yellow.

EXAMPLE VIII

Example I was repeated, using an iron-metal solution containing 25.8 grams per liter of $FeSO_4.7H_2O$ and 2.8 grams per liter of LiCl. On addition of the sodium carbonate solution, the reaction mixture was powder blue. After 1.5 hours of oxidation, the color turned dark red-brown and held. A product which was deep red-brown was obtained.

EXAMPLE IX

Example I was repeated, except that the dark-brown product was subsequently calcined at 600° C., and a black product was obtained.

EXAMPLE X

Example V was repeated, except that the orange product was subsequently calcined at 600° C., and a burnt-orange product was obtained.

EXAMPLE XI

Example VI was repeated, except that the product, originally vivid orange, was subsequently calcined at 600° C., and a burnt-orange product was obtained.

It will be observed that Examples IX to XI indicate that there is some change of color upon calcination at 600° C. This might appear to contradict the earlier statements to the effect that the spinel pigments of the present invention are temperature-stable at temperature of up to 900° C. The observed color is, at least in part, a function of the particle size, and at least some growth of the particle size occurs upon exposure of the pigment to advanced temperatures. When a product yielding transparent coatings is desired, it is necessary to limit the initial particle size approximately in order that it will remain fine enough not to interfere undesirably with the transparency of the coatings after the particle growth associated with high-temperature exposure has taken place. The changes in color which occur upon calcination are, in general, noticeably less great than those which would occur in a transparent iron oxide pigment or other pigment of a kind in which such calcination is accompanied by phase transformation or crystal rearrangement, so that in this sense, it is true that, even in their uncalcined state, spinel pigments made according to the present invention may be said to be more temperature-stable than the transparent iron oxide pigments, and the same pigments in their calcined state are even more temperature-stable; they are even less subject to variation in color with exposure to high temperatures.

While I have shown and described herein certain embodiments of the invention, it is intended that there be covered as well any change or modification therein which may be made without departing from the spirit and scope of the invention.

The embodiments of the invention in which an exclusive property or privilege is claimed are defined as follows:

1. A temperature-stable spinel in the form of acicular particles having a length of 0.01 to 0.13 micron and consisting essentially of oxygen, iron, and at least one metal, said spinel corresponding to the formula $$XFe_2O_4$$

wherein X is said other metal, said other metal being one selected from the group consisting of Cu, Ca, Cd, Co, Ba, Sr, and Mn.

2. A temperature-stable spinel in the form of acicular particles having a length of 0.01 to 0.13 micron and consisting essentially of oxygen, iron, and lithium, said spinel corresponding to the formula LiFe$_5$O$_8$.

3. A spinel of claim 1 wherein said other metal is Ba.
4. A spinel of claim 1 wherein said other metal is Sr.
5. A spinel of claim 1 wherein said other metal is Co.
6. A method of making a pigment having good stability at high temperatures, said method consisting essentially of the steps of forming a first aqueous solution consisting essentially of water, a soluble ferrous salt, and at least one other salt, said salt being a soluble salt of a non-ferrous metal selected from the group consisting of copper, calcium, cadmium, cobalt, barium, strontium, manganese, and lithium, said ferrous salt and said non-ferrous salt being present in said solution in proportions such that the respective quantities of iron and other metal which are present will yield, when said solution is so adjusted in pH as to cause precipitation, the formation of a substantial quantity of a precipitate oxidizable to a spinel of the formula XFe$_2$O$_4$, or YFe$_5$O$_8$ in which X is a metal selected from the group consisting of Cu, Cd, Ca, Co, Ba, Sr, and Mn, and Y is Li, mixing with said first aqueous solution a second aqueous solution to form a reaction mixture, said second solution containing a substantial proportion of a soluble alkalizing compound selected from the group consisting of the carbonates, bicarbonates, and hydroxides of the alkali metals, the said second solution being used in such quantity and the said first and second solutions being in such a state of dilution that there results upon said mixing the formation of a precipitate in the form of particles of sub-micron size, the liquid phase of said reaction mixture being as a result of such precipitation substantially completely depleted in its content of lithium ions and metal ions having a valence greater than one;

oxidizing the said precipitate to form a spinel in aqueous solution;

then heating said aqueous solution having said spinel therein to a temperature of from about 75° to 100° C.; and recovering said spinel.

7. A method as defined in claim 6, wherein the step of oxidizing is done by subjecting the precipitate to the action of gaseous elemental oxygen by aeration.

8. A method as defined in claim 6, wherein said soluble ferrous salt is a hydrated salt.

9. A method as defined in claim 6 wherein said alkalizing compound is sodium carbonate.

* * * * *